June 30, 1931. D. C. SPURGEON 1,811,900
AWNING
Original Filed Aug. 13, 1927
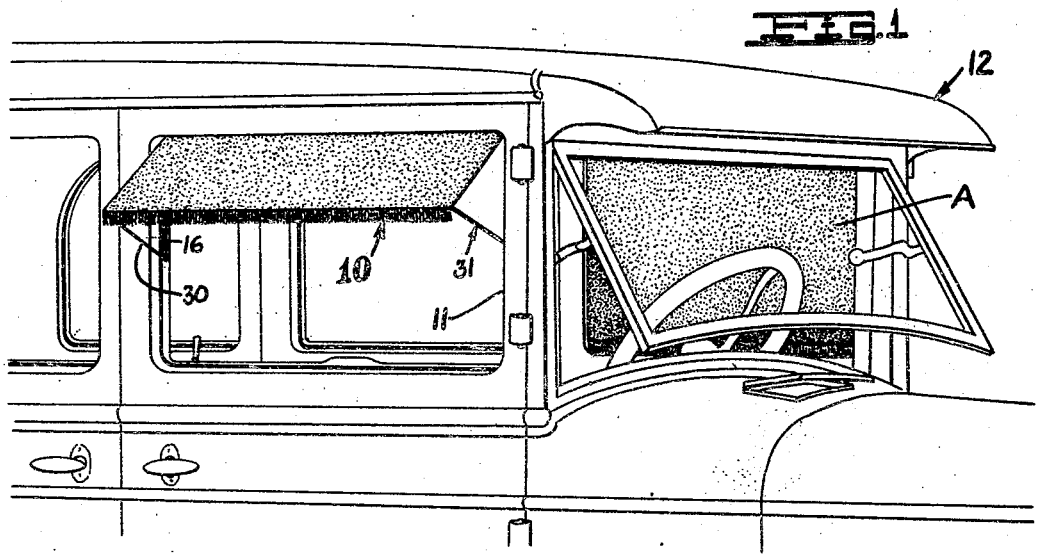
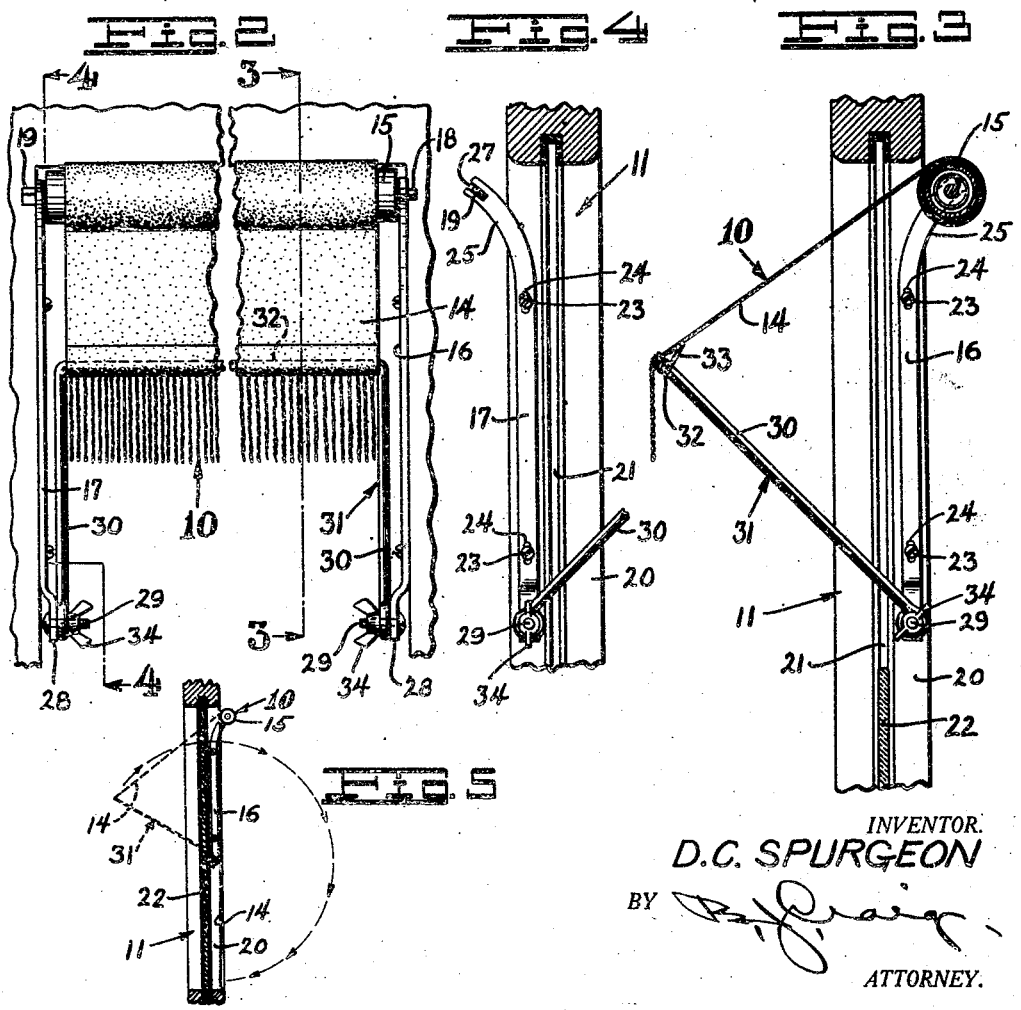
INVENTOR.
D.C. SPURGEON
BY
ATTORNEY.

Patented June 30, 1931

1,811,900

UNITED STATES PATENT OFFICE

DEE C. SPURGEON, OF LOS ANGELES, CALIFORNIA

AWNING

Application filed August 13, 1927, Serial No. 212,654. Renewed November 29, 1930.

This invention relates to improvements in awnings.

The general object of this invention is to provide an improved swinging awning particularly adapted for use on automobile windows.

Another object of this invention is to provide a roller awning which is to be secured to the inside portion of a window frame and which is adapted to be extended to various adjusted positions outside.

Another object of the invention is to provide an awning of the class described having a pivoted bracket for supporting the free end of the awning and wherein the bracket is adapted to move under the awning roller.

A further object of this invention is to provide an awning of the class described which may be used either as an awning or as a window shade.

Other objects and advantages of this invention will be apparent from the following description taken in consideration with the accompanying drawings wherein:

Fig. 1 is a fragmentary perspective view of an enclosed automobile showing my improved awning in various positions thereon.

Fig. 2 is an inside face view of my improved awning showing it attached to a window frame.

Fig. 3 is a section taken on line 3—3 of Fig. 2, showing my improved awning swung outward.

Fig. 4 is a section taken on line 4—4 of Fig. 2 showing one of the awning roller supporting brackets, and Fig. 5 is a view similar to Fig. 3 showing the awning as swung inward to form a window shade.

Referring to the drawings by reference characters I have indicated one embodiment of my improved awning generally at 10 and have shown it as used in connection with a window 11 of an enclosed automobile 12 although it will be understood that my improved device may be used on other than automobile windows.

My improved device 10 comprises a strip of fabric 14 mounted upon a spring retractor roller 15 which is supported at its ends in brackets 16 and 17. The roller 15 is preferably of the usual type in general use and actuates in the same manner as the standard window shade rollers. It includes at one end a shaft 18 and at the other end a flattened portion 19.

The brackets 16 and 17 are preferably secured to the sides 20 of the window 11 and inside of the channel 21 in which a window glass 22 slides. As shown the brackets 16 and 17 are secured to the window frame sides 20 by screws 23 which pass through slots 24 in the brackets. The slots 24 allow adjustment in assembling and are particularly desirable when the screws 23 are inserted in holes which have been provided for other purposes.

The top ends of each of the brackets 16 and 17 are shown as curved inwardly as at 25 so that the roller 15 will not interfere with the complete closing of the window glass 22. Adjacent the top end of the bracket 16 I provide a circular aperture for the insertion therethrough of the shaft 18 of the roller 15 and at the top end of the bracket 17 I provide a slot 27 having flattened sides against which the flattened portion 19 of the roller 15 is positioned as shown in Fig. 4.

The lower ends of the brackets 16 and 17 are offset as at 28 (see Fig. 2) and are each provided with a pivot screw 29 which supports one arm 30 of a U-frame 31. The portion 42 of the U-frame which connects the arms 30 is positioned in a loop 33 provided upon and preferably integral with the free end of the awning fabric 14.

For securing the U-frame in various adjusted positions I provide on each of the pivot screws 29 a wing nut 34 which when tightened clamps the arms 30 to the brackets 16 and 17.

When using my device as an extension awning the window glass 22 is moved down to a point below the pivot screws 29, the U-frame 31 swung outward carrying with it the fabric 14, and clamped by the wing nuts 34 in any desired position. To retract the awning the wing nuts 34 are loosened and a slight downward jerk imparted to the free end of the awning which will then be retracted by the spring action of the roller 15 in the same manner as an ordinary window shade.

The length of the arms 30 allows the connecting portion 32 to pass under the roller 15 so that when desired the U-frame may be swung downward towards the bottom of the window as shown in Fig. 5 so that the fabric 14 forms a window shade as shown at A in Fig. 1.

From the foregoing description it will be apparent that I have provided a novel curtain device which may be used as an all angle awning or for a window shade which is simple in construction, can be economically manufactured, is readily installed and highly efficient in operation.

Having thus described my invention, I claim:

A bracket for use in a window opening, said bracket including a body having a straight main portion and having one end portion curved and extending away from said main portion, the other end portion being laterally offset and parallel to the main portion, there being an aperture in said offset portion and an open ended slot in said curved portion.

In testimony whereof, I hereunto affix my signature.

DEE C. SPURGEON.